(12) United States Patent
Richardson et al.

(10) Patent No.: US 10,018,061 B2
(45) Date of Patent: Jul. 10, 2018

(54) VANE TIP MACHINING FIXTURE ASSEMBLY

(71) Applicant: United Technologies Corporation, Hartford, CT (US)

(72) Inventors: Carl S. Richardson, South Berwick, ME (US); John A. Szymbor, Sanford, ME (US)

(73) Assignee: United Technologies Corporation, Farmington, CT (US)

( * ) Notice: Subject to any disclaimer, the term of this patent is extended or adjusted under 35 U.S.C. 154(b) by 191 days.

(21) Appl. No.: 14/774,050

(22) PCT Filed: Mar. 11, 2014

(86) PCT No.: PCT/US2014/023470
§ 371 (c)(1),
(2) Date: Sep. 9, 2015

(87) PCT Pub. No.: WO2014/197044
PCT Pub. Date: Dec. 11, 2014

(65) Prior Publication Data
US 2016/0017735 A1   Jan. 21, 2016

Related U.S. Application Data

(60) Provisional application No. 61/777,701, filed on Mar. 12, 2013.

(51) Int. Cl.
*B23Q 3/06* (2006.01)
*B23C 3/16* (2006.01)
(Continued)

(52) U.S. Cl.
CPC ........... *F01D 9/041* (2013.01); *F01D 25/246* (2013.01); *B23C 3/16* (2013.01); *B23C 3/18* (2013.01); *B23C 2215/04* (2013.01); *B23C 2215/045* (2013.01); *B23C 2215/44* (2013.01); *B23C 2260/68* (2013.01); *B23C 2270/08* (2013.01); *B23Q 3/06* (2013.01); *B23Q 3/062* (2013.01); *B23Q 3/063* (2013.01); *B25B 11/02* (2013.01); *F05D 2230/10* (2013.01); *F05D 2230/14* (2013.01); *F05D 2240/12* (2013.01); *F05D 2300/501* (2013.01); *Y02T 50/66* (2013.01);
(Continued)

(58) Field of Classification Search
CPC ............ F05D 2230/10; F05D 2230/14; F05D 2240/12; F05D 2300/501; Y10T 29/49316; Y10T 29/4932; Y10T 29/49336; Y10T 409/30868; Y10T 409/309016; Y10T 409/303752; Y10T 409/303808; Y02T 50/672; Y02T 50/66; B23Q 3/062; B23Q 3/063; B23C 3/16; B23C 3/18; B23C 2260/68; B23C 2270/08; B25B 11/02
USPC ...... 269/40; 29/557, 558, 889, 889.2, 889.6, 29/889.7, 889.71; 409/219, 225, 131, 132
See application file for complete search history.

(56) References Cited

U.S. PATENT DOCUMENTS

| 2,846,847 A * | 8/1958 | Simmons .............. F01D 25/162 60/39.37 |
| 4,238,170 A | 12/1980 | Robideau et al. |

(Continued)

*Primary Examiner* — Bayan Salone
(74) *Attorney, Agent, or Firm* — O'Shea Getz P.C.

(57) ABSTRACT

A vane tip machining fixture assembly includes a first clamp ring mountable to a fixture, the first clamp ring includes a rigid back ring mounted to a resilient ring.

11 Claims, 12 Drawing Sheets

(51) Int. Cl.
   *B23C 3/18*       (2006.01)
   *B25B 11/02*      (2006.01)
   *F01D 9/04*       (2006.01)
   *F01D 25/24*      (2006.01)

(52) U.S. Cl.
   CPC .......... *Y02T 50/672* (2013.01); *Y10T 29/4932* (2015.01); *Y10T 29/49316* (2015.01); *Y10T 29/49336* (2015.01); *Y10T 409/30868* (2015.01); *Y10T 409/303752* (2015.01); *Y10T 409/303808* (2015.01); *Y10T 409/309016* (2015.01)

(56) References Cited

U.S. PATENT DOCUMENTS

| | | |
|---|---|---|
| 4,274,805 A | 6/1981 | Holmes |
| 4,395,195 A | 7/1983 | De Cosmo |
| 5,282,718 A | 2/1994 | Koff |
| 5,308,225 A | 5/1994 | Koff |
| 5,562,404 A | 10/1996 | Koff |
| 5,950,308 A | 9/1999 | Koff |
| 7,195,453 B2 | 3/2007 | Martin |
| 7,229,247 B2 | 6/2007 | Durocher et al. |
| 7,229,249 B2 | 6/2007 | Durocher et al. |
| 7,241,108 B2 | 7/2007 | Lewis |
| 7,246,994 B2 | 7/2007 | Lewis |
| 7,407,369 B2 | 8/2008 | Shhwarz et al. |
| 7,909,570 B2 | 3/2011 | Durocher et al. |
| 8,011,883 B2 | 9/2011 | Schwarz et al. |
| 8,038,388 B2 | 10/2011 | Freling |
| 8,167,546 B2 * | 5/2012 | Shi .............. F01D 9/04 415/173.1 |
| 8,186,933 B2 | 5/2012 | Doss |
| 8,850,703 B2 * | 10/2014 | Zhu .............. B23C 3/18 29/889.23 |
| 8,966,755 B2 * | 3/2015 | McMahon .............. F01D 9/042 269/309 |
| 2008/0282541 A1 | 11/2008 | Anderson et al. |
| 2009/0113683 A1 | 5/2009 | Secherling |
| 2010/0175256 A1 * | 7/2010 | Zhu .............. B23C 3/18 29/889.7 |
| 2011/0052384 A1 * | 3/2011 | Shi .............. F01D 9/04 415/200 |
| 2012/0233858 A1 * | 9/2012 | McMahon .............. F01D 9/042 29/888.012 |

* cited by examiner

VANE TIP MACHINING FIXTURE ASSEMBLY

This application claims priority to PCT Patent Appln. No. PCT/US2014/023470 filed Mar. 1, 2014, which claims priority to U.S. Patent Appln. No. 61/777,701 filed Mar. 12, 2013.

BACKGROUND

The present disclosure relates to a gas turbine engine and, more particularly, to a machining fixture therefor and to methods of machining air foil tips.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis and axially alternating arrays of stationary vanes and rotatable blades. Each vane array may be constructed of multiple vane clusters distributed circumferentially about the interior of the case with each cluster being supported by the case. Some vane arrays include clusters of cantilevered vanes.

During engine operation, the vane clusters may be subject to non-uniform heating and cooling as well as movement to a running position. Such movement, as well as the potential for a non-perfectly round case complicates the initial machining of the vane arrays to provide a desired radial tip spacing with respect to the rotor assemblies.

SUMMARY

An airfoil tip machining fixture assembly according to one disclosed non-limiting embodiment of the present disclosure includes a fixture and a first clamp ring mountable to the fixture, the first clamp ring includes a rigid back ring mounted to a resilient ring.

A further embodiment of the foregoing embodiment of the present disclosure wherein the resilient ring is manufactured of rubber.

A further embodiment of any of the foregoing embodiments of the present disclosure wherein the resilient ring is mountable toward the fixture.

A further embodiment of any of the foregoing embodiments of the present disclosure includes wherein the first clamp ring is mountable to the fixture with a multiple of fasteners.

In the alternative or additionally thereto, the foregoing embodiment includes wherein the multiple of fasteners are angled with respect to an engine central longitudinal axis.

In the alternative or additionally thereto, the foregoing embodiment includes a second clamp ring mountable to the first clamp ring with a multiple of fasteners.

In the alternative or additionally thereto, the foregoing embodiment includes wherein the multiple of fasteners are angled with respect to the engine central longitudinal axis.

In the alternative or additionally thereto, the foregoing embodiment includes a third clamp ring mountable to the second clamp ring with a multiple of fasteners.

In the alternative or additionally thereto, the foregoing embodiment includes wherein the multiple of fasteners are angled with respect to the engine central longitudinal axis.

A method of machining tips of a multiple of cantilevered mounted stator vane airfoils of a gas turbine engine according to another disclosed non-limiting embodiment of the present disclosure includes resiliently biasing the multiple of cantilevered mounted stator vane airfoils with a clamp ring.

A further embodiment of the present disclosure includes fastening the clamp ring to a fixture.

A further embodiment of any of the foregoing embodiments of the present disclosure includes fastening the clamp ring to a fixture with a multiple of fasteners, the multiple of fasteners angled with respect to an engine central longitudinal axis.

A further embodiment of any of the foregoing embodiments of the present disclosure includes fastening a second clamp ring to the clamp ring.

A further embodiment of any of the foregoing embodiments of the present disclosure includes fastening the second clamp ring to the clamp ring with a multiple of fasteners, the multiple of fasteners angled with respect to the engine central longitudinal axis.

A further embodiment of any of the foregoing embodiments of the present disclosure includes machining the tips of the multiple of cantilevered mounted stator vane airfoils with respect to an engine central longitudinal axis.

A further embodiment of any of the foregoing embodiments of the present disclosure includes resiliently biasing the multiple of cantilevered mounted stator vane airfoils in each of a multiple of stages with a respective clamp ring.

A further embodiment of any of the foregoing embodiments of the present disclosure includes resiliently biasing the multiple of cantilevered mounted stator vane airfoils in each of a multiple of stages with a respective clamp ring, a resilient ring of the respective clamp ring directed toward a fixture.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
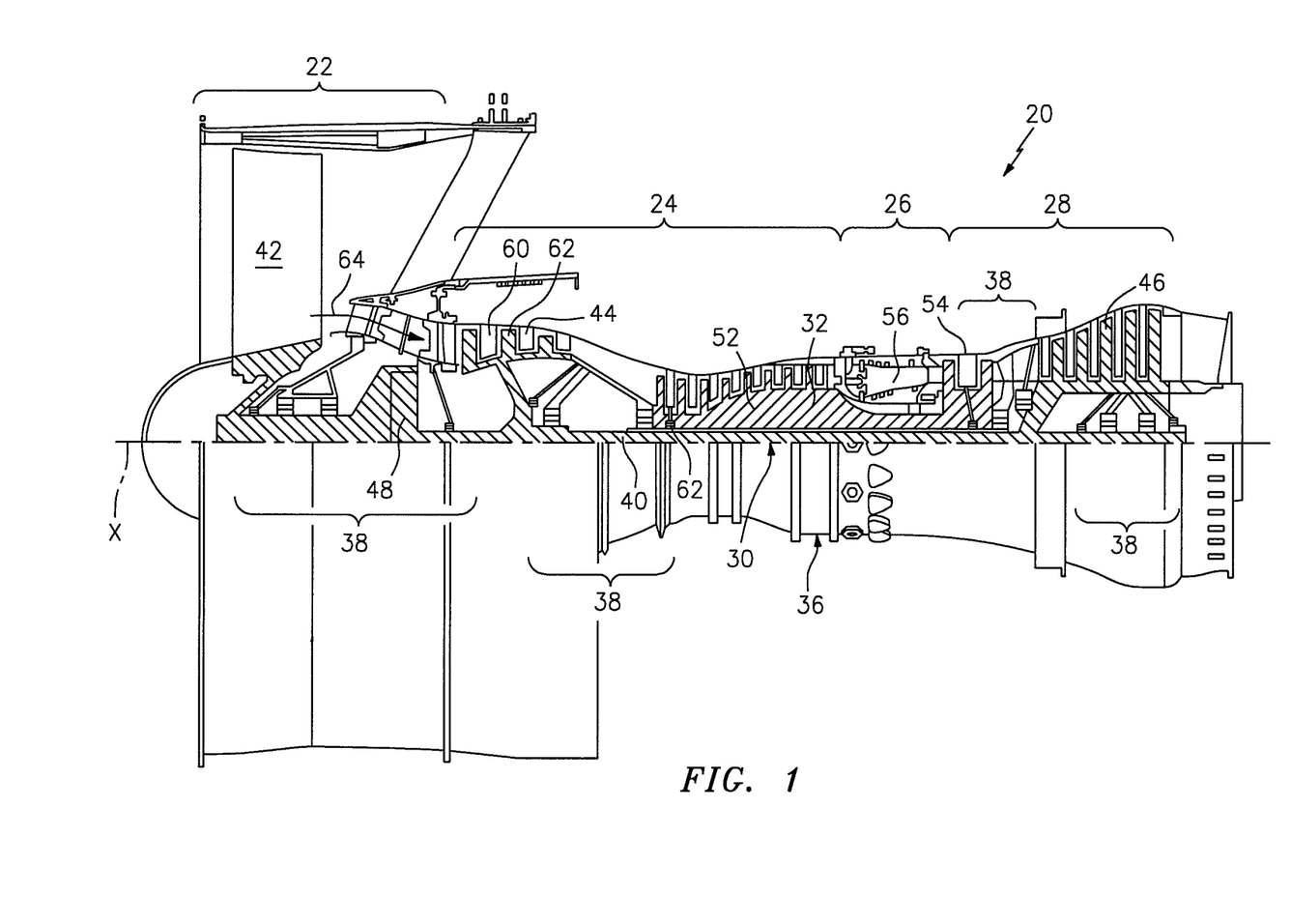
FIG. 1 is a schematic cross-section of an example gas turbine engine.
Figure 2:
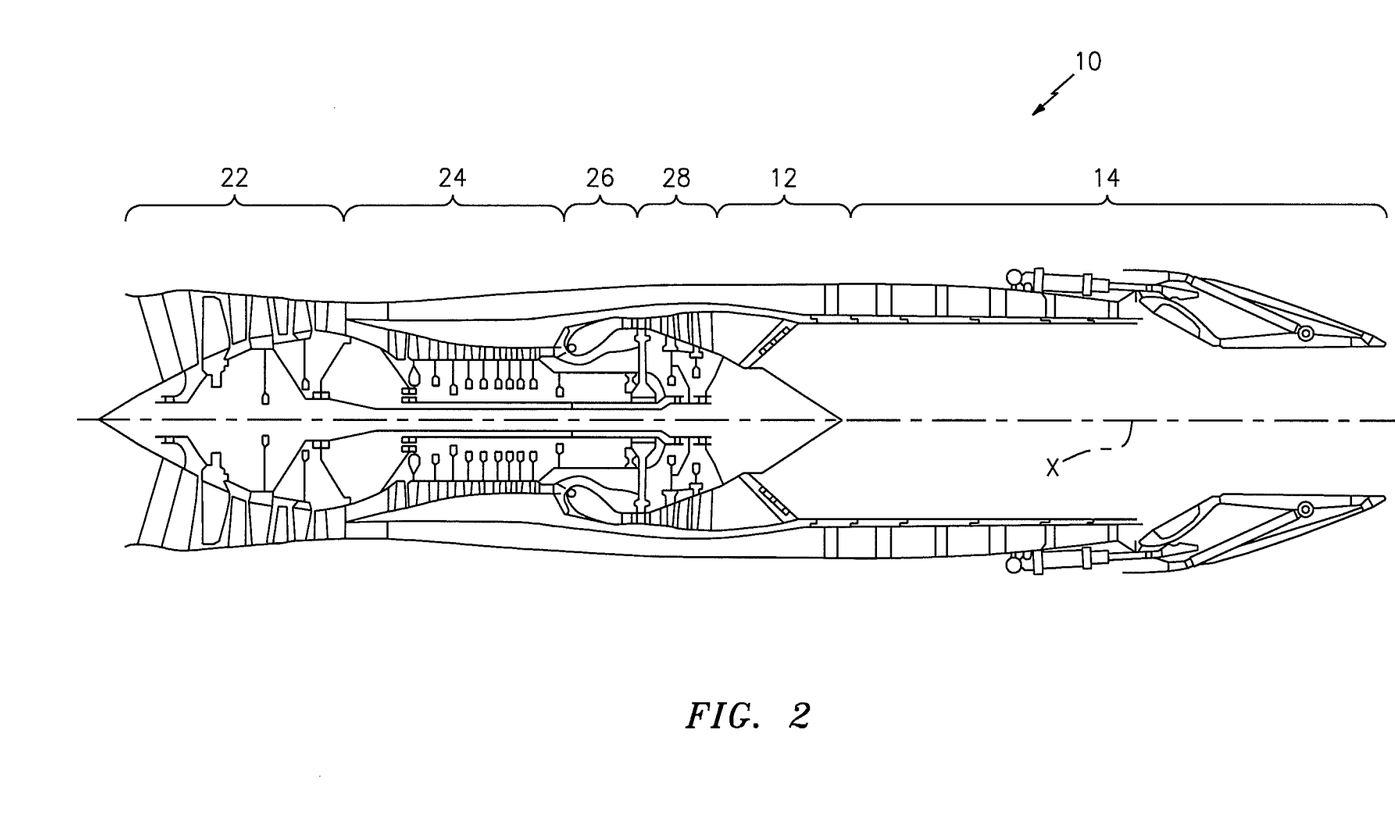
FIG. 2 is a schematic cross-section of another example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 10 might include an augmentor section 12 and exhaust duct section 14 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan (FIG. 2), turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

The HPC 52 includes a multiple of stages with alternate stationary vane arrays 60 and rotational rotor assemblies 62 along an airflow passage 64. Although the HPC 52 is illustrated in the disclosed non-limiting embodiment, other engine sections will also benefit herefrom. Moreover, although a particular number of stages are illustrated, it should be appreciated that any number of stages will benefit herefrom.

Figure 3:
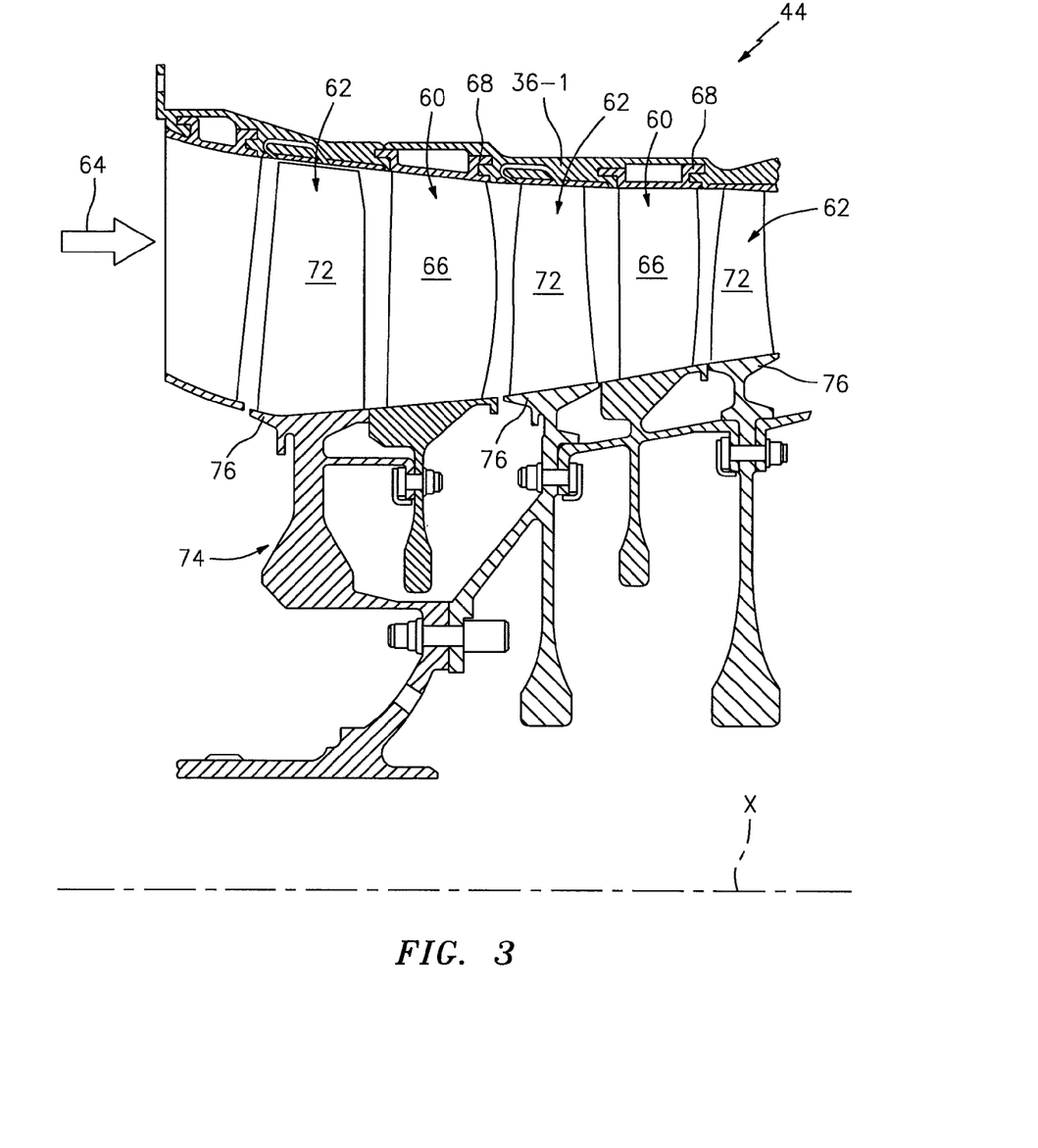
FIG. 3 is a schematic expanded cross-section of a portion of an engine case with a multiple of cantilevered mounted stator vane airfoils of a multiple of vane clusters.
Figure 4:
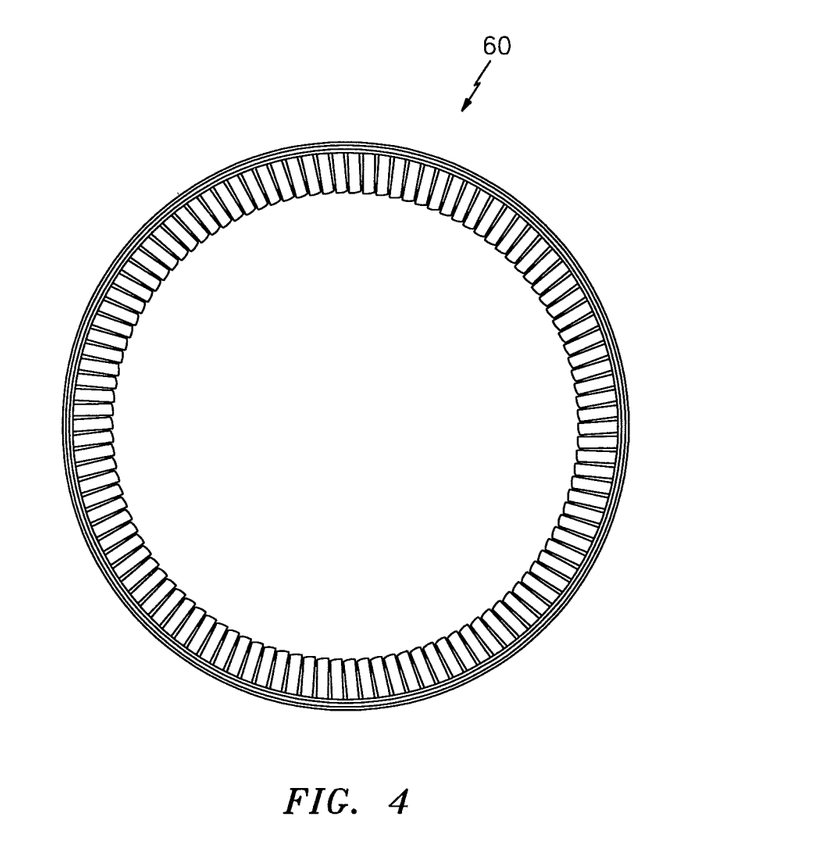
FIG. 4 is a front view of a vane array with a multiple of cantilevered mounted stator vane airfoils of a multiple of vane clusters.

With reference to FIG. 3, each vane array 60 (also shown in FIG. 4) includes a multiple of cantilevered mounted stator vane airfoils 66 that extend in a cantilever manner from an outer platform 68 toward the engine central longitudinal axis X. The outer platform 68 is mounted to the engine static structure 36 such as an engine case 36-1 via, for example, segmented hooks or other interfaces. Each vane array 60 may be formed of a multiple of vane clusters 70 (FIG. 5) each with a multiple of cantilevered mounted stator vane airfoils 66. It should be understood that various numbers of cantilevered mounted stator vane airfoils 66 and vane clusters 70 will benefit herefrom.

Each of the rotor assemblies 62 includes a multiple of blades 72 supported by a respective rotor hub 74. The outer platform 68 and airfoils 66 of the vane arrays 60 and a platform 76 that extends from each of the multiple of blades 72 generally bounds the airflow passage 64. The multiple of cantilevered mounted stator vane airfoils 66 extend in a cantilever manner from the engine case 36-1 such that the cantilevered mounted stator vane airfoils 66 extend toward the engine axis X to be disposed in close proximity to the hub 74. Provision for close clearances between the cantilevered mounted stator vane airfoils 66 and the rotor hub 74 increases engine efficiency.

Figure 5:
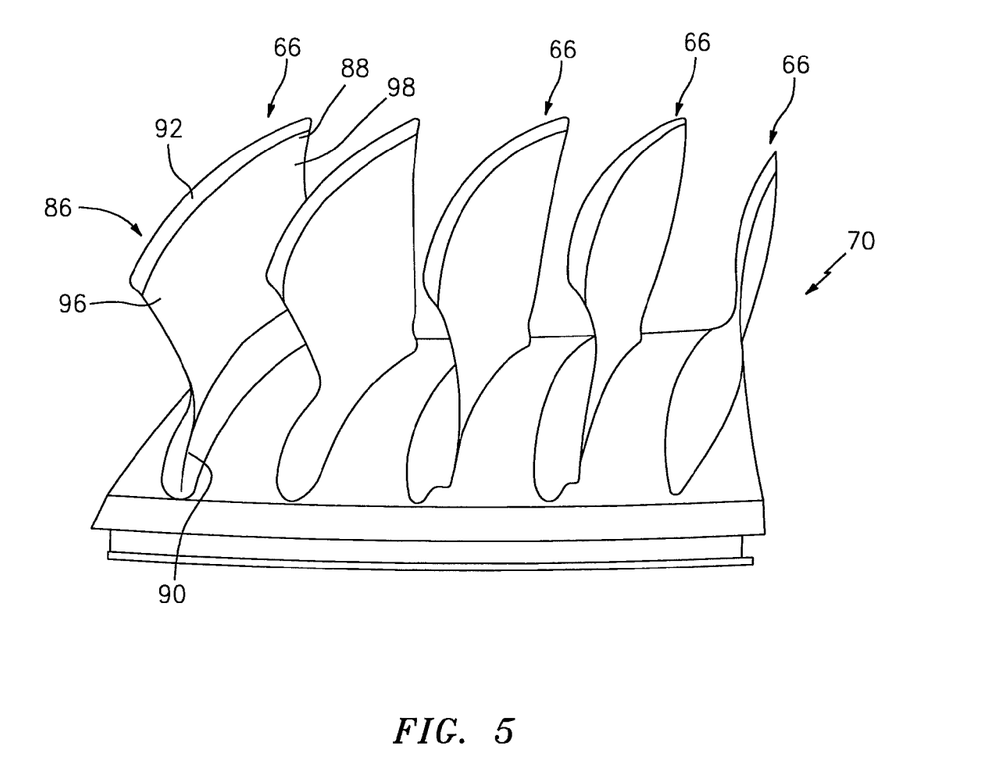
FIG. 5 is a perspective view of a vane cluster.

With reference to FIG. 5, each cantilevered mounted stator vane airfoil 66 includes a first sidewall 86 that may be convex and defines a suction side, and a second sidewall 88 that may be concave and define a pressure side of the cantilevered mounted stator vane airfoils 66. Sidewalls 86, 88 are joined at the leading edge 96 and at an axially spaced trailing edge 98. More specifically, the airfoil trailing edge 98 is spaced chordwise and downstream from the airfoil leading edge 96. The sidewall 86 and sidewall 88, respectively, extend longitudinally or radially outward in span from an airfoil root 90 to a tip 92. Each vane cluster 70 may be manufactured from a metallic alloy such as, but not limited to, titanium or a composite material.

Figure 6:
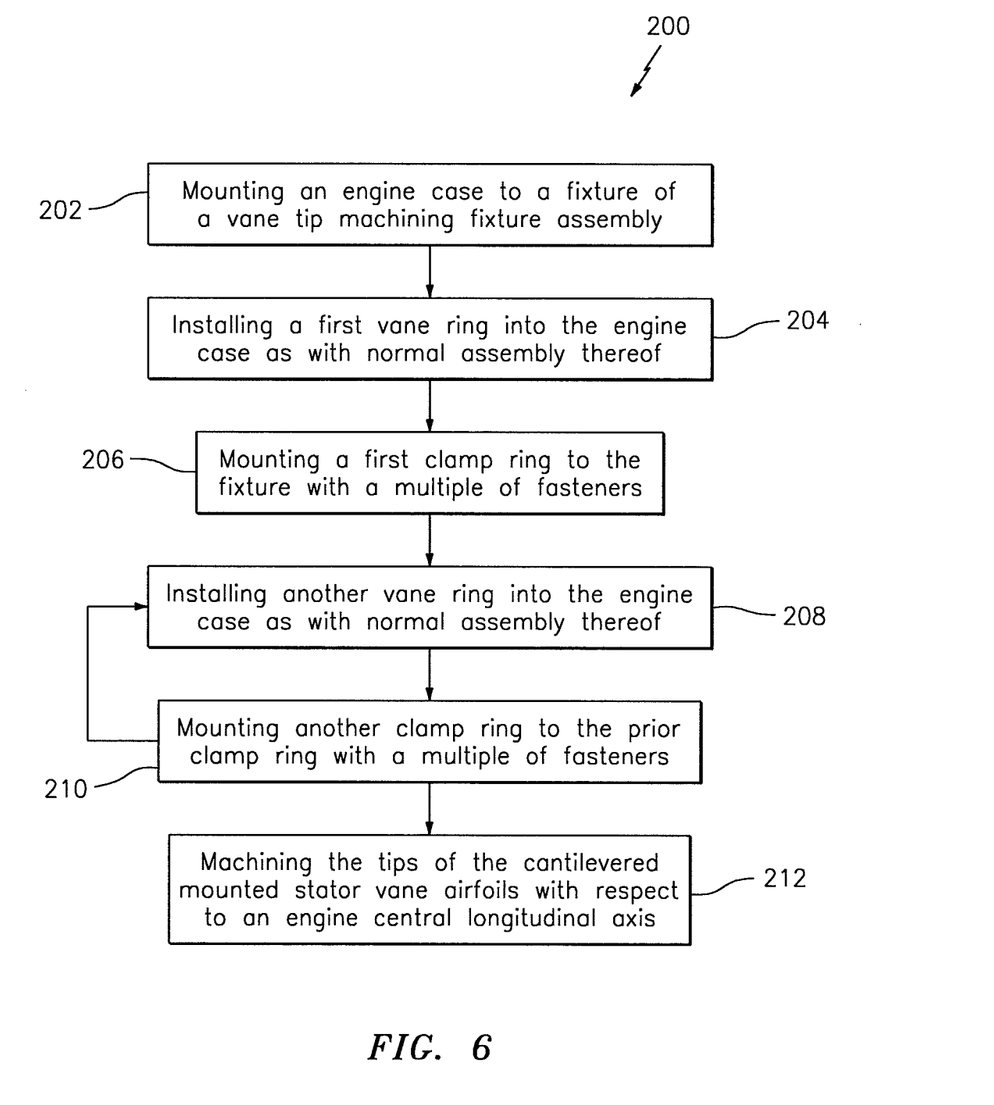
FIG. 6 is a method of vane tip machining according to one disclosed non-limiting embodiment.
Figure 7:
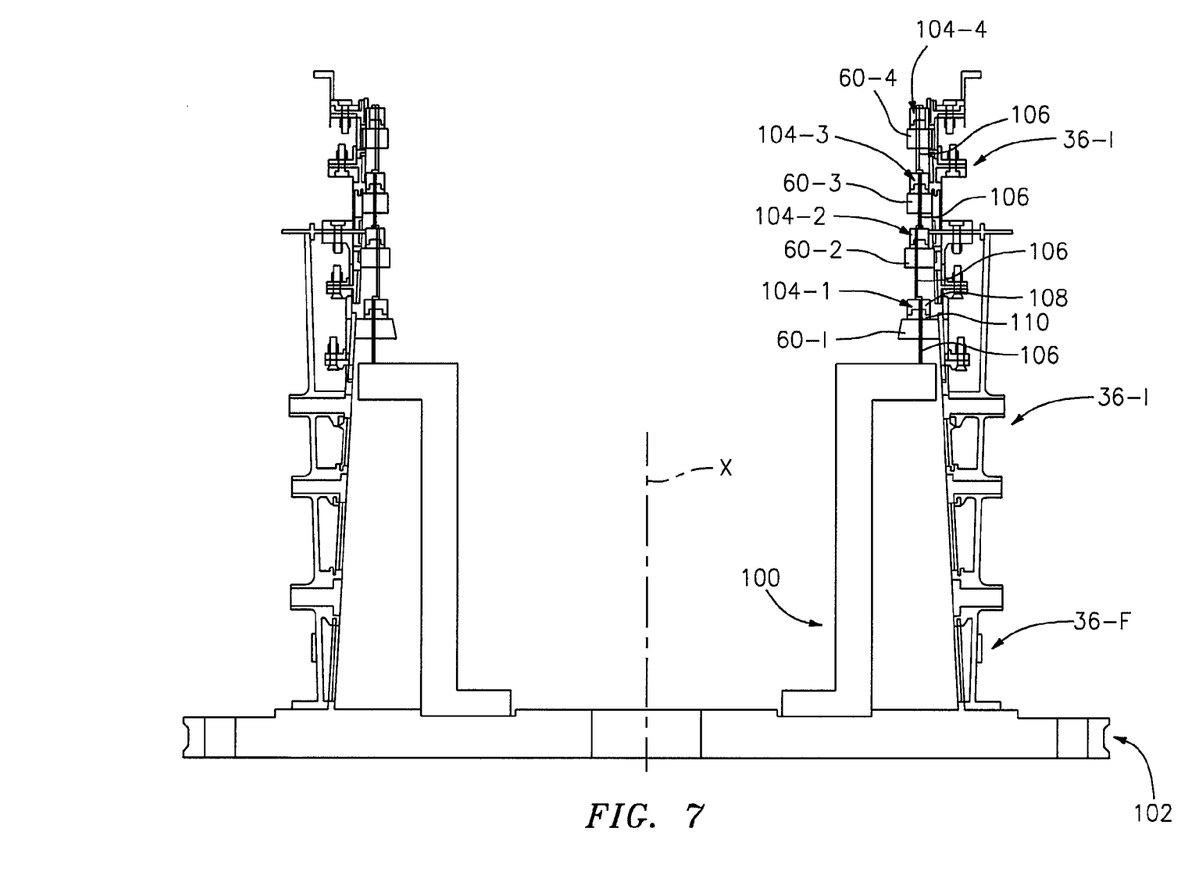
FIG. 7 is a cross-section of a portion of an engine case mounted to a vane tip machining fixture assembly.

With reference to FIG. 6, a method 200 of machining the tips 92 of the cantilevered mounted stator vane airfoils 66 according to one disclosed non-limiting embodiment is shown. Initially, the engine case 36-1 is mounted to a vane tip machining fixture assembly 102 (Step 202). In the disclosed non-limiting embodiment, a forward portion 36-F of the engine case 36-1 is mounted downward upon the vane tip machining fixture assembly 102. The first vane array 60-1 is then installed into the engine case 36-1 as with normal assembly thereof (Step 204; FIG. 7). That is, the multiple of vane clusters 70 of the first vane array 60-1 are installed into the engine case 36-1 and as during eventual full engine assembly and their circumferential position is recorded.

Figure 8:
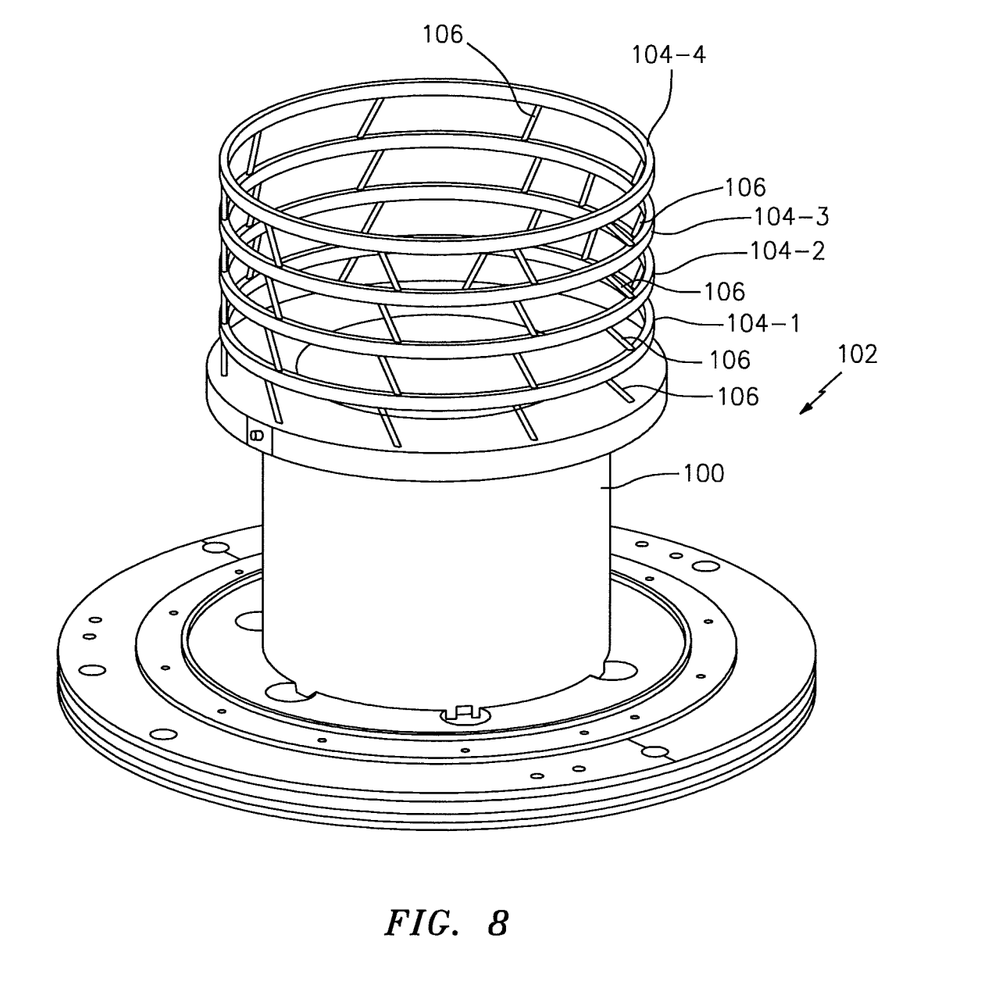
FIG. 8 is a perspective view of the vane tip machining fixture assembly.
Figure 9:
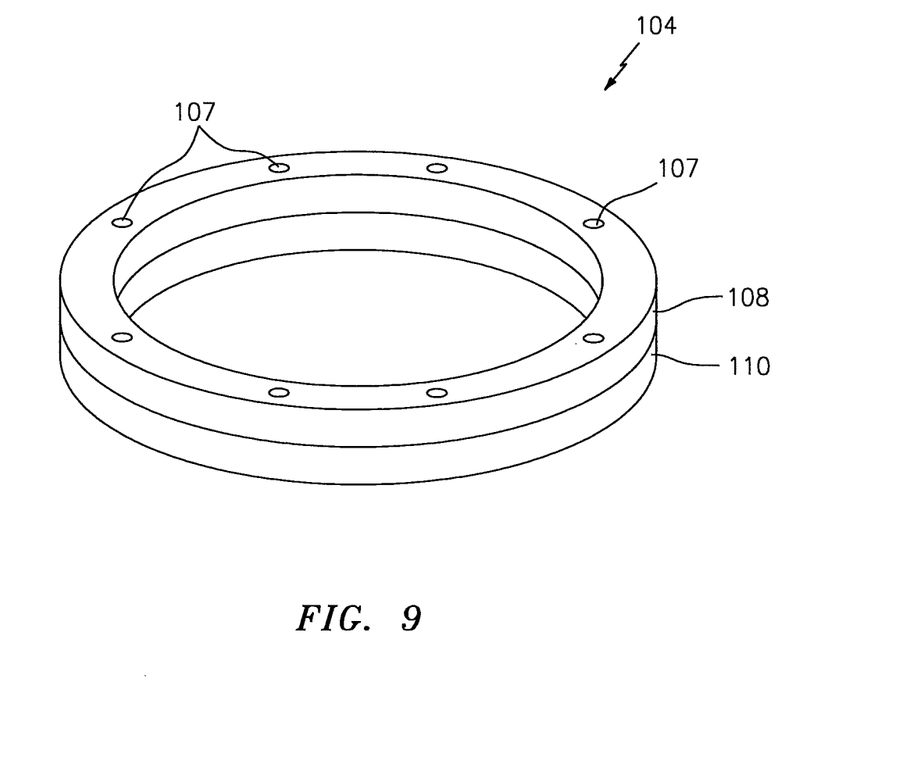
FIG. 9 is a perspective view of a clamp ring of the vane tip machining fixture assembly.

Then, a first clamp ring 104-1 is bolted or otherwise attached to a fixture 100 (FIG. 7) of vane tip machining fixture assembly 102 with a multiple of fasteners 106 (Also shown in FIG. 8; Step 206). The fasteners 106 may be angled with respect to the engine central longitudinal axis X so as to pass between the cantilevered mounted stator vane airfoils 66. Each clamp ring 104 generally includes a rigid back ring 108 that, for example, may be manufactured of a metal alloy, to which is bonded a resilient ring 110 that, for example, may be manufactured of a rubber, neoprene, nitrile, or other resilient material (FIG. 9). The rigid back ring 108 and the resilient ring 110 are of approximately equal thickness in one disclosed non-limiting embodiment, and the resilient ring 110 is of a thickness to accommodate potential axial tolerances between the trailing edge 98 of the cantilevered mounted stator vane airfoils 66 on the multiple of vane clusters 70.

The first clamp ring 104-1 biases the multiple of vane clusters 70 of first vane array 60-1 forward to a running position with a predetermined torque application to the fastener 106. That is, the first clamp ring 104-1 provides pressure upon the trailing edge 98 of the cantilevered mounted stator vane airfoils 66 to position each of the multiple of vane clusters 70 to their forwardmost position which will be the running position or the multiple of vane clusters 70 of first vane array 60-1 during engine operation. The first clamp ring 104-1 is axially located generally where a rotor assembly 62 (FIG. 3) and its multiple of blades 72 would otherwise be located and the resilient ring 110 accommodates potential axial tolerances between the cantilevered mounted stator vane airfoils 66 of the multiple of vane clusters 70.

The multiple of vane clusters 70 of a second vane array 60-2 of the second stage is then installed into the engine case 36-1 as with normal assembly thereof (Step 208). Then, a second clamp ring 104-2 is bolted to the first clamp ring 104-1 with a second multiple of fasteners 106-2 into apertures 107. The second multiple of fasteners 106-2 may also be angled with respect to the engine central longitudinal axis X so as to pass between the cantilevered mounted stator vane airfoils 66 (Step 210).

Figure 10:
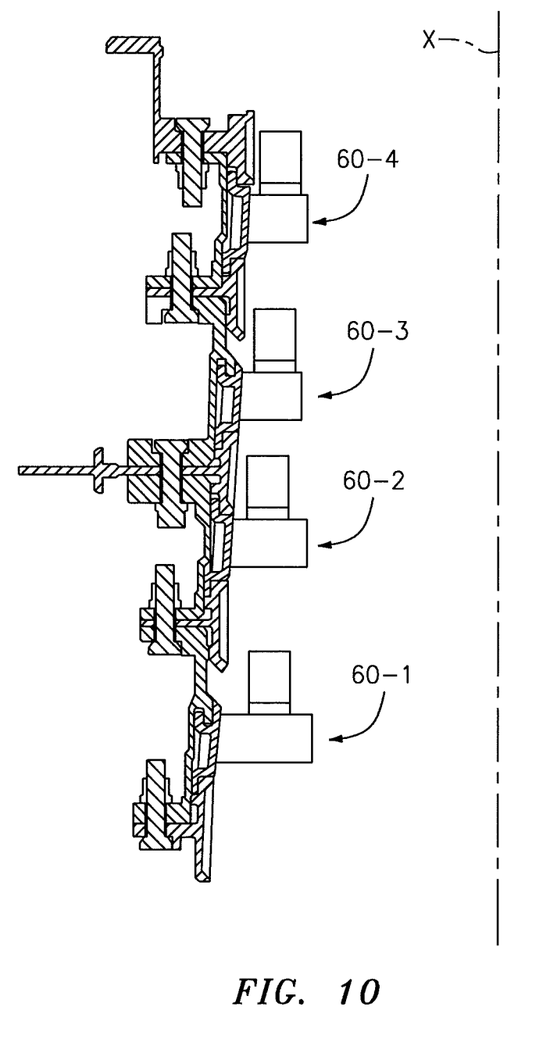
FIG. 10 is an expended cross-section of a portion of an engine case with clamp rings mounted thereto.

The assembly of the next vane array 60-n (Step 208) and next clamp ring 104-n (Step 210) are then installed into the engine case 36-1 as above described (FIG. 10). It should be appreciated that although four (4) stages are illustrated, any number of stages will benefit herefrom.

Figure 11:
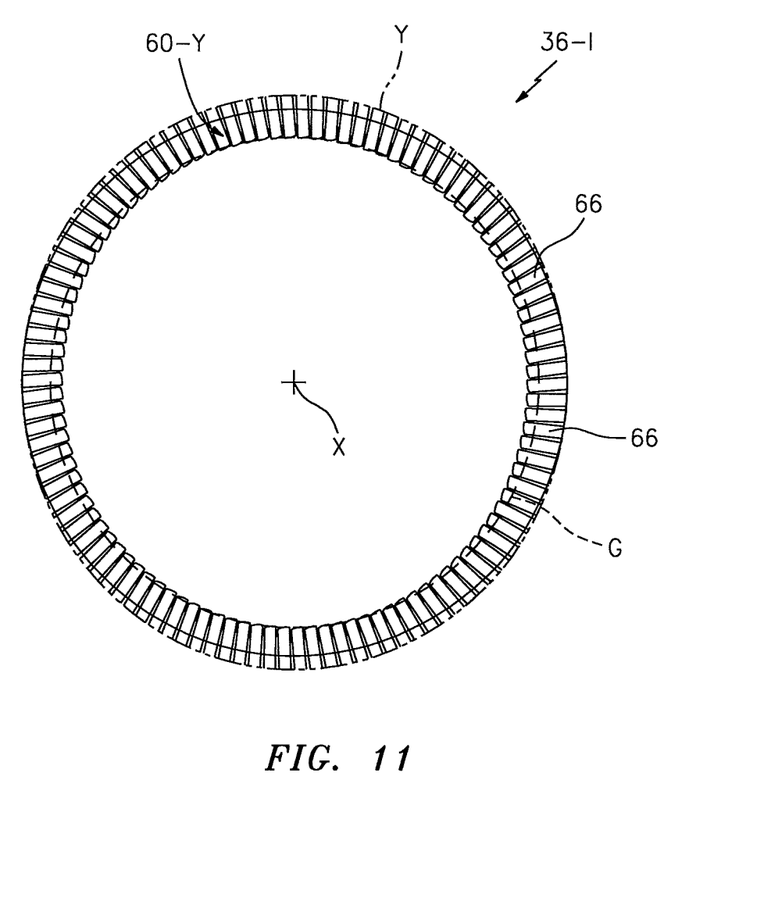
FIG. 11 is a schematic view of a vane array with a multiple of cantilevered mounted stator vane airfoils of a multiple of vane clusters illustrating an eccentric engine case and a machining operation thereto.
Figure 12:
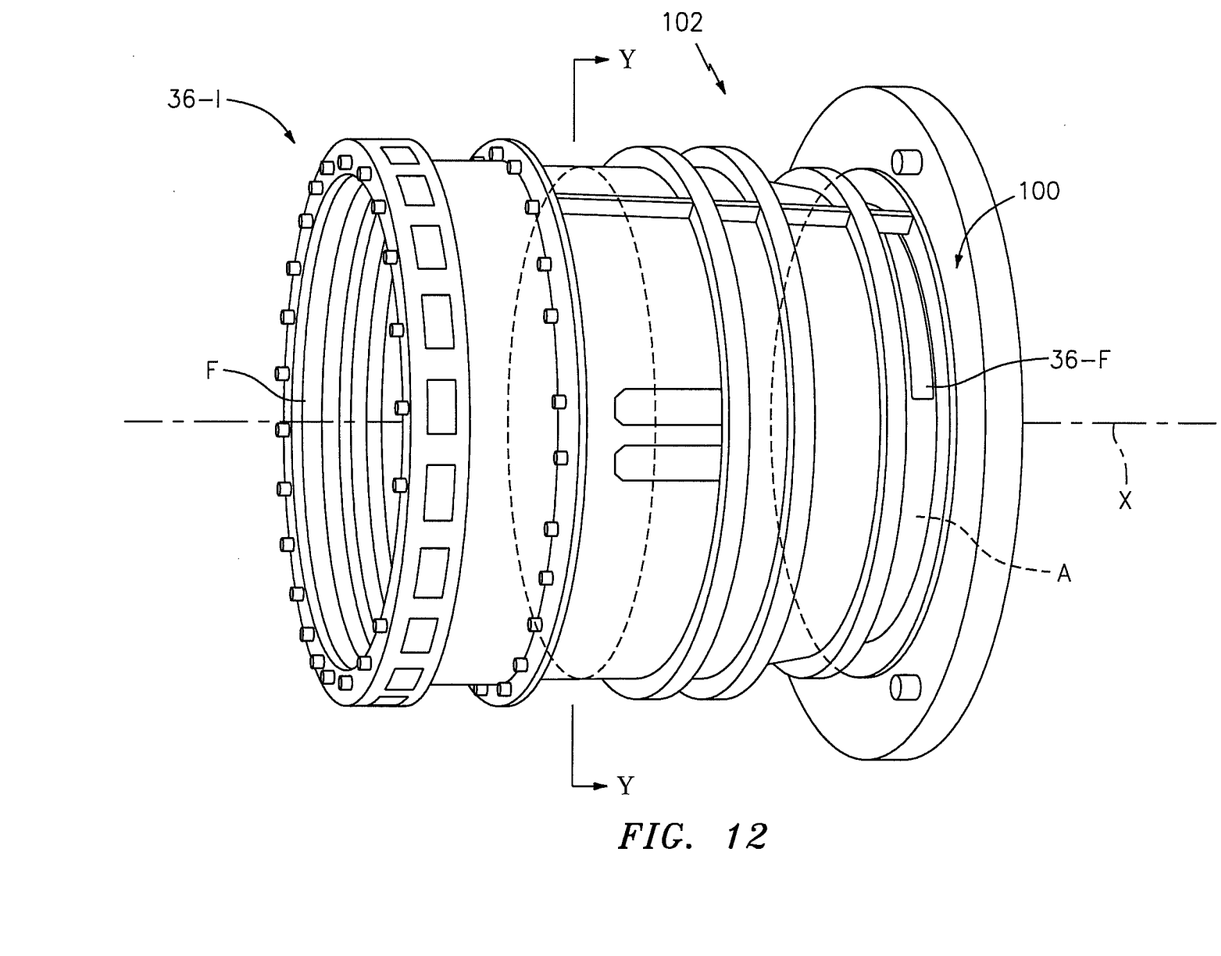
FIG. 12 is a schematic side view of an engine case.

With reference to FIG. 11, once all the vane array stages are installed, a machining operation such as a grinding operation is performed (Step 212). A grinding wheel, for example, may then be directed axially along the engine central longitudinal axis X. In disclosed non-limiting embodiment, the engine central longitudinal axis X is centrally defined from a forward plane F of the engine case 36-1 to an aft plane A of the engine case 36-1 (FIG. 12). That is, the engine central longitudinal axis X of the engine case 36-1 is defined where the engine shaft will pass through the engine case 36-1 (FIG. 1). It should be appreciated that any particular cross section, for example, cross-section Y, through the engine case 36-1, however, may not be perfectly concentric with respect to the engine central longitudinal axis X (eccentricity shown exaggerated for illumination). That is, the engine case 36-1 and thus the associated vane array 60-y may not be perfectly circular. This, in combination with the tolerances in the manufacture of each of the cantilevered mounted stator vane airfoils 66 of the multiple of vane clusters 70 may result in a further non-circular distortion of the periphery defined by the vane tips 92.

By directing the machining operation with respect to the engine central longitudinal axis X, each of the vane tips 92 are ground to be concentric with respect to the engine central longitudinal axis X. That is, any eccentricities in the engine case 36-1 and/or the cantilevered mounted stator vane airfoils 66 of the multiple of vane clusters 70, are ground away to provide a constant tolerance with respect to the rotor assemblies.

The resilient ring 110 of each clamp ring 104 dampens the machining vibrations, tolerates the variation in vane trailing edges 98 and preloads the multiple of vane clusters 70 to simulate engine operation. The resilient ring 110 of each clamp ring 104 also ensures that none of the trailing edges 98 of the multiple of vane clusters 70 are unsupported which could cause vibration and potential breakage when machined.

While this method is being described for use in a gas turbine engine, it will be understood that this machine operation has utility in other rotating machinery applications.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil tip machining fixture assembly, comprising:
a fixture;
a first clamp ring mountable to the fixture with a first multiple of fasteners, the first clamp ring includes a rigid back ring mounted to a resilient ring; and
a second clamp ring mountable to the first clamp ring with a second multiple of fasteners,
wherein the first multiple of fasteners are angled with respect to an engine central longitudinal axis.

2. The assembly as recited in claim 1, wherein the resilient ring is manufactured of rubber.

3. The assembly as recited in claim 1, wherein the resilient ring is mountable toward the fixture.

4. The assembly as recited in claim 1, wherein the second multiple of fasteners are angled with respect to the engine central longitudinal axis.

5. The assembly as recited in claim 4, further comprising a third clamp ring mountable to the second clamp ring with a third multiple of fasteners.

6. The assembly as recited in claim 5, wherein the third multiple of fasteners are angled with respect to the engine central longitudinal axis.

7. A method of machining tips of a multiple of cantilevered mounted stator vane airfoils of a gas turbine engine comprising:
resiliently biasing the multiple of cantilevered mounted stator vane airfoils with a first clamp ring;
fastening the first clamp ring to a fixture with a first multiple of fasteners, the first multiple of fasteners angled with respect to an engine central longitudinal axis; and
fastening a second clamp ring to the first clamp ring.

8. The method as recited in claim 7, further comprising:
fastening the second clamp ring to the first clamp ring with a second multiple of fasteners, the second multiple of fasteners angled with respect to the engine central longitudinal axis.

9. The method as recited in claim 7, further comprising:
machining the tips of the multiple of cantilevered mounted stator vane airfoils with respect to the engine central longitudinal axis.

10. The method as recited in claim 7, further comprising:
resiliently biasing the multiple of cantilevered mounted stator vane airfoils in each of a multiple of stages with a respective clamp ring.

11. The method as recited in claim 7, further comprising:
resiliently biasing the multiple of cantilevered mounted stator vane airfoils in each of a multiple of stages with a respective clamp ring, a resilient ring of the respective clamp ring directed toward the fixture.

* * * * *